(12) United States Patent
Maes, II

(10) Patent No.: US 11,169,845 B2
(45) Date of Patent: Nov. 9, 2021

(54) FLOW AND APPLICATION BASED PROCESSOR SCHEDULING FOR NETWORK FUNCTIONS VIRTUALIZATION APPLICATIONS USING FLOW IDENTIFICATION BASED ON LOGICAL CALCULATIONS ON FRAME BASED FIELDS

(71) Applicant: Ciena Corporation, Hanover, MD (US)

(72) Inventor: Richard Donald Maes, II, Liberty Lake, WA (US)

(73) Assignee: Ciena Corporation, Hanover, MD (US)

( * ) Notice: Subject to any disclaimer, the term of this patent is extended or adjusted under 35 U.S.C. 154(b) by 261 days.

(21) Appl. No.: 15/850,345

(22) Filed: Dec. 21, 2017

(65) Prior Publication Data

US 2019/0196870 A1    Jun. 27, 2019

(51) Int. Cl.
*G06F 9/48* (2006.01)
*G06F 9/455* (2018.01)
*G06F 9/50* (2006.01)
*H04L 12/24* (2006.01)

(52) U.S. Cl.
CPC ........ *G06F 9/4881* (2013.01); *G06F 9/45558* (2013.01); *G06F 9/5038* (2013.01); *G06F 2009/4557* (2013.01); *G06F 2009/45595* (2013.01); *H04L 41/0806* (2013.01); *H04L 41/12* (2013.01)

(58) Field of Classification Search
CPC .. G06F 9/4881; G06F 9/45558; G06F 9/5038; G06F 2009/45595; G06F 2009/4557
See application file for complete search history.

(56) References Cited

U.S. PATENT DOCUMENTS

| | | | | |
|---|---|---|---|---|
| 6,351,454 | B1* | 2/2002 | Crocker | H04L 45/00 370/235 |
| 6,721,309 | B1* | 4/2004 | Stone | H04L 49/153 370/362 |
| 7,990,974 | B1* | 8/2011 | Gmuender | G06F 9/5044 370/392 |
| 2003/0172104 | A1* | 9/2003 | Hooman | G06F 9/4881 718/103 |
| 2003/0235209 | A1* | 12/2003 | Garg | H04L 12/4675 370/468 |
| 2009/0116507 | A1* | 5/2009 | Kanda | H04L 47/263 370/464 |
| 2009/0328055 | A1* | 12/2009 | Bose | G06F 1/3203 718/105 |
| 2009/0328219 | A1* | 12/2009 | Narayanaswamy | H04L 63/1425 726/23 |

(Continued)

*Primary Examiner* — Michael W Ayers
(74) *Attorney, Agent, or Firm* — Clements Bernard Baratta; Lawrence A. Baratta, Jr.; Christopher L. Bernard

(57) ABSTRACT

Systems and methods of scheduling for Network Function Virtualization (NFV) on processing resources include receiving multiple flows from different customers and different applications; classifying the multiple flows to provide classified flows; distributing the classified flows to a plurality of queues; and providing each of the classified flows in the plurality of queues to the processing resources, wherein each individual classified flow is distributed to a same processing resource thereby maintaining flow order of the individual classified flow.

20 Claims, 6 Drawing Sheets

(56) References Cited

U.S. PATENT DOCUMENTS

| | | | |
|---|---|---|---|
| 2013/0138920 A1* | 5/2013 | Ge | H04L 47/2441 |
| | | | 712/30 |
| 2014/0344826 A1* | 11/2014 | Wu | G06F 9/4843 |
| | | | 718/104 |
| 2015/0020135 A1* | 1/2015 | Frusina | H04N 21/2405 |
| | | | 725/116 |
| 2015/0026794 A1* | 1/2015 | Zuk | H04L 45/64 |
| | | | 726/13 |
| 2015/0071072 A1* | 3/2015 | Ratzin | G06F 9/455 |
| | | | 370/235 |
| 2015/0261556 A1* | 9/2015 | Jain | H04L 49/70 |
| | | | 718/1 |
| 2015/0355938 A1* | 12/2015 | Jokinen | G06F 9/4881 |
| | | | 718/107 |
| 2015/0358425 A1* | 12/2015 | Vennelakanti | G01V 1/28 |
| | | | 709/226 |
| 2015/0370586 A1* | 12/2015 | Cooper | G06F 9/45533 |
| | | | 710/308 |
| 2016/0048449 A1 | 2/2016 | Maes, II | |
| 2016/0070585 A1* | 3/2016 | Tsirkin | G06F 9/5083 |
| | | | 718/1 |
| 2019/0158428 A1* | 5/2019 | Gray | H04L 69/321 |

\* cited by examiner

FLOW AND APPLICATION BASED PROCESSOR SCHEDULING FOR NETWORK FUNCTIONS VIRTUALIZATION APPLICATIONS USING FLOW IDENTIFICATION BASED ON LOGICAL CALCULATIONS ON FRAME BASED FIELDS

FIELD OF THE DISCLOSURE

The present disclosure generally relates to networking systems and methods. More particularly, the present disclosure relates to flow and application based processor scheduling for Network Function Virtualization (NFV) applications.

BACKGROUND OF THE DISCLOSURE

Network Function Virtualization (NFV) is a network architecture concept that uses the technologies of virtualization to virtualize entire classes of network node functions into building blocks that may connect, or chain together, to create communication services. A Virtualized Network Function (VNF) may include one or more Virtual Machines (VMs) running different software and processes, on top of standard high-volume servers, switches, and storage devices, or even cloud computing infrastructure, instead of having custom hardware appliances for each network function.

There is a requirement for scheduling traffic in NFV to x86 or the like processor cores. The simplest known solution is to direct all traffic from a singular port to a singular core for processing. The first in and first out nature of this processing behavior maintains flow order for all frames into the port. More advanced solutions include the ability to classify traffic to a logical interface and distribute traffic based on that logical interface. A Logical Interface (LIF) might be a Port+Virtual Local Area Network (VLAN) Identifier (VID) type classification, a Port+Internet Protocol (IP) destination, or UDP destination port. Even more advanced solutions might be to distribute based on frame priority, where Port+VID+Priority are used to distribute traffic. In each of these cases, however, it is possible that a particular user might have multiple applications in use and all of them would be potentially categorized into the same LIF. Furthermore, multiple users might be in the same LIF and thus jockeying for the same Central Processing Unit (CPU) resources.

In the purpose-built hardware arena, there are vendors who build application distribution platforms where identification of user traffic is used for forwarding/routing packets to other network appliances for the purpose of more efficiently using the network interconnect and end-point application servers. However, there are no conventional approaches which distribute application or user classified traffic to the CPU core granularity for the purpose of accelerating the x86-based network switch itself.

Due to software limitations in x86-based NVF applications, the ability to classify traffic to a flow can be challenging and will affect throughput. Generally, elements such VLAN's and IP addresses are identified, with some attention to priorities if frame prioritization is required. As such, an NFV solution will direct all of the VLAN's traffic, or all IP from a certain source, or to a certain destination, to a singular core or Virtual Machine (VM) resource to ensure frame ordering. This can be a lot of traffic directed to a singular core. In some cases, this is further enhanced by adding VLAN priorities or IP Type of Service (TOS) into the distribution. But it is a given that traffic of the same priority on a given VLAN may still be from multiple users or from multiple applications. Unfortunately, further classification in software-based NFV is limited specifically because Ternary Content-Addressable Memory (TCAM)-like lookups are so intensive.

BRIEF SUMMARY OF THE DISCLOSURE

Adding mathematical calculation to the process, something that x86 platforms excel at, solves the issue of random distribution. But it does not solve the issue of "controlled" distribution, where it is desired that high paying customers are distributed evenly among high-end processors, and low paying customers get sent to other lower-end processing resources. This requires a mixture of both solutions on a frame-by-frame basis, which may be implemented as a low-performance solution in software or as a high-performance hardware-based solution.

In an embodiment, a method of scheduling for Network Function Virtualization (NFV) on processing resources includes receiving multiple flows from different customers and different applications; classifying the multiple flows to provide classified flows; distributing the classified flows to a plurality of queues; and providing each of the classified flows in the plurality of queues to the processing resources, wherein each individual classified flow is distributed to a same processing resource thereby maintaining flow order of the individual classified flow. The classifying can differentiate the multiple flows on an application basis. The classifying can differentiate the multiple flows on both an application basis and a user basis. The classifying can differentiate the multiple flows on both an application basis and a user basis, and wherein each application can be assigned a designated priority with the distributing including providing flows of a same priority to different queues. The classifying can differentiate the multiple flows based on different priorities. The processing resources can include one or more of individual processing cores in a multi-core processing system and Virtual Machines (VMs). The processing resources can include individual processing cores in a multi-core processing system such that each individual classified flow is distributed to a same processing core thereby maintaining flow order of the individual classified flow. The distributing can utilize a plurality of characteristics of each individual flow to assign a queue based thereon. The classifying and the distributing can assign a queue based on a user and application for each flow.

In another embodiment, a system configured to perform scheduling for Network Function Virtualization (NFV) on processing resources includes one or more classifiers configured to receive multiple flows from different customers and different applications and to classify the multiple flows into classified flows; and a distributor configured to distribute the classified flows to a plurality of queues, wherein the plurality of queues are each connected to associated processing resources to provide each of the classified flows thereto, wherein each individual classified flow is distributed to a same processing resource thereby maintaining flow order of the individual classified flow. The one or more classifiers can differentiate the multiple flows on an application basis. The one or more classifiers can differentiate the multiple flows on both an application basis and a user basis. The one or more classifiers can differentiate the multiple flows on both an application basis and a user basis, and wherein each application can be assigned a designated priority with the distributor providing flows of a same priority to different queues. The one or more classifiers can differentiate the multiple flows based on different priorities. The processing resources can include one or more of individual processing cores in a multi-core processing system and Virtual Machines (VMs). The processing resources can include individual processing cores in a multi-core processing system such that each individual classified flow is distributed to a same processing core thereby maintaining flow order of the individual classified flow. The distributor can utilize a plurality of characteristics of each individual flow to assign a queue based thereon. The one or more classifiers and the distributor can assign a queue based on a user and application for each flow.

In a further embodiment, an apparatus for scheduling for Network Function Virtualization (NFV) on processing resources includes circuitry configured to receive multiple flows from different customers and different applications; circuitry configured to classify the multiple flows to provide classified flows; circuitry configured to distribute the classified flows to a plurality of queues; and circuitry configured to provide each of the classified flows in the plurality of queues to the processing resources, wherein each individual classified flow is distributed to a same processing resource thereby maintaining flow order of the individual classified flow. The circuitry can be implemented in one or more Field Programmable Gate Arrays (FPGAs).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
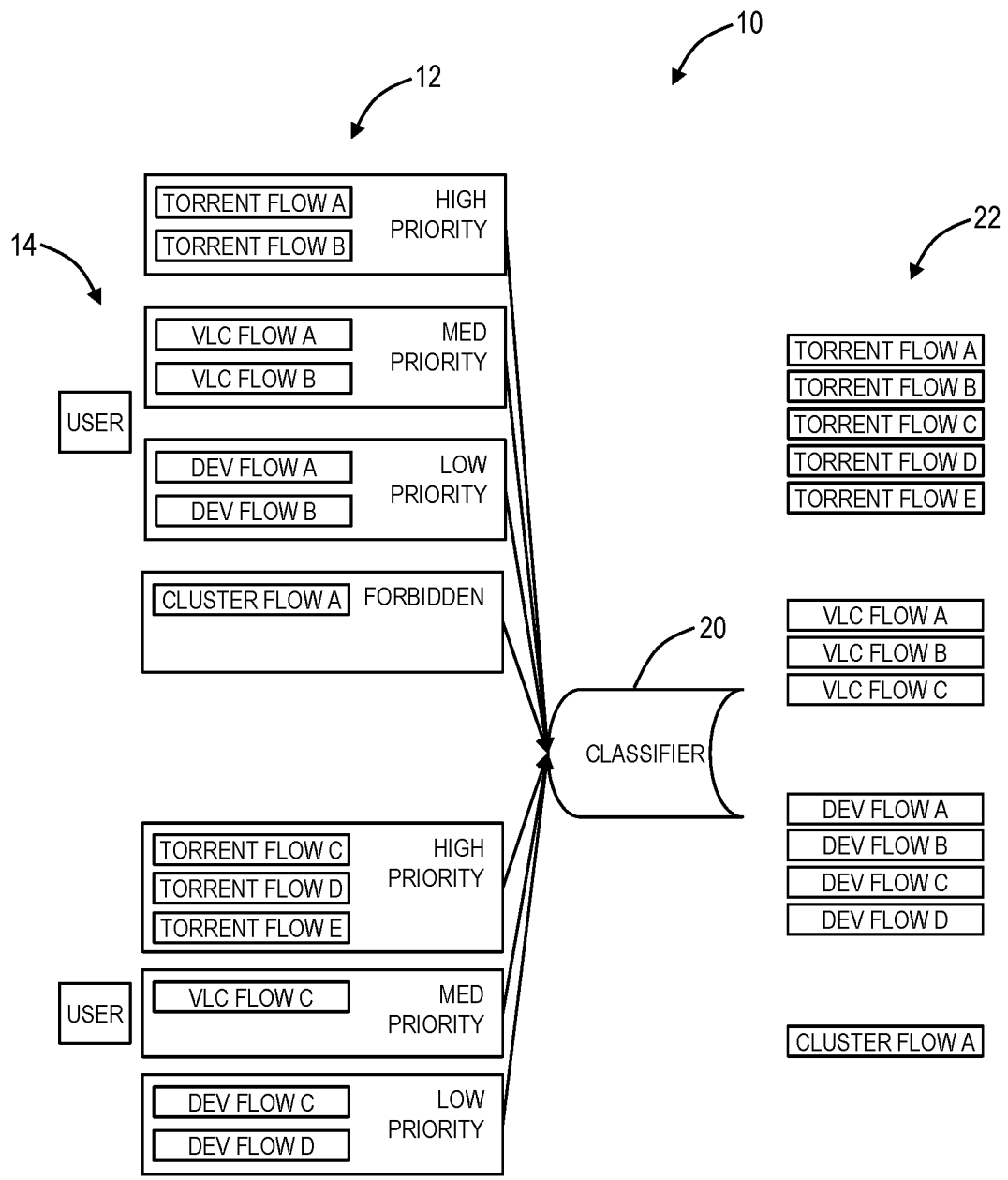
FIG. 1 is a block diagram of a classifier system which classifies flows from users.

The present disclosure relates to systems and methods for flow and application based processor scheduling for Network Function Virtualization (NFV) applications. The systems and methods utilize existing classification techniques traditionally used to establish frame treatment, for the purposes of editing, coloring, or traffic prioritization, in combination with techniques for polynomial calculation, traditionally used for Link Aggregate distribution, to automatically route and schedule frames, based on frame content and user configuration, to specific processing resources (CPUs), within an x86-based processing environment in a way that establishes and can take advantage of premium and economy services across a pool of CPU resources. The systems and methods may be implemented as either a low-performance software solution or a high-performance hardware solution (e.g., via Field Programmable Gate Arrays (FPGAs)).

The systems and methods provide a mechanism that protects flow order, such that frames of a plurality of flows and priorities are returned in the order sent relative to their flow, regardless of the number of flows, and a number of processing entities involved, using a technique previously used for link aggregate distribution. Advantageously, this eliminates any need for software to track and apply frame metadata to maintain order while processing frames in parallel across multiple CPUs. The systems and methods provide a way to increase and decrease the number of processing entities available in real-time and are compatible with fast failover operations thus allowing many flows to be switched to new processing resources with minimal software overhead in the event of hardware or software failure.

The systems and methods including identifying a flow or an application by its content, determining which flow it belongs to in real-time, and sending that flow to a particular processor core or VM. The nature of a singular core allows for frame order to be maintained internally, but the nature of a multi-core, parallel system, is such that merging multiple streams requires management to ensure that frame order is maintained as the output of each singular core is placed back into the output of the whole. With the ability to extract and identify singular flows on the fly, singular flows can be directed to a singular core or VM, where only the traffic in that flow must maintain order relative to itself. This means that when traffic merges from the individual cores back into the whole, there is no requirement to ensure that order is maintained because the flow order is already ensured by virtue of the singular CPU core processing order. This gives the ability to precisely control how many flows are directed to particular processing resources, and thus, entire logical interfaces can be serviced in a parallel way without fear of frame reordering within the flows contained within the logical interface. It also provides an ability to give preference to certain types of flows, video traffic for instance, to higher performance processors, VMs or CPU's, while web traffic is pushed to lower end resources.

FIG. 1 is a block diagram of a classifier system 10 which classifies flows 12 from users 14. In this example, there are two users 14; of course, additional users 14 are contemplated. A first user 14 has four example applications—torrent flows A, B which are a high priority, VLC (video) flows A, B which are a medium priority, development (DEV) flows A, B which are a low priority, and a cluster flow A which is forbidden. A second user has three example applications—torrent flows C, D, E which are a high priority, VLC flow C which is a medium priority, and DEV flows C, D which are a low priority. Each of these flows 12 is connected to the classifier 20.

The classifier 20 can be software-based, hardware-based, or a combination. For example, in an embodiment, the classifier 20 can be hardware, such as FPGAs or Application Specific Integrated Circuits (ASICs). The classifier 20 can be programmed to find specific applications. However, conventionally, the classifier 20 can be programmed to find different instances of applications per flow, when used by the same user. However, this would require a classifier per application and per user which is complex to manage.

In the example of FIG. 1, the classifier 20 is configured to find applications and sort them into their desired priorities, i.e., high, medium, low, and forbidden. At that basic level of classification, and without further identification, all traffic classified to the application must be kept in frame order. That is, outputs of the classifier 20 include classified flows 22.

Figure 2:
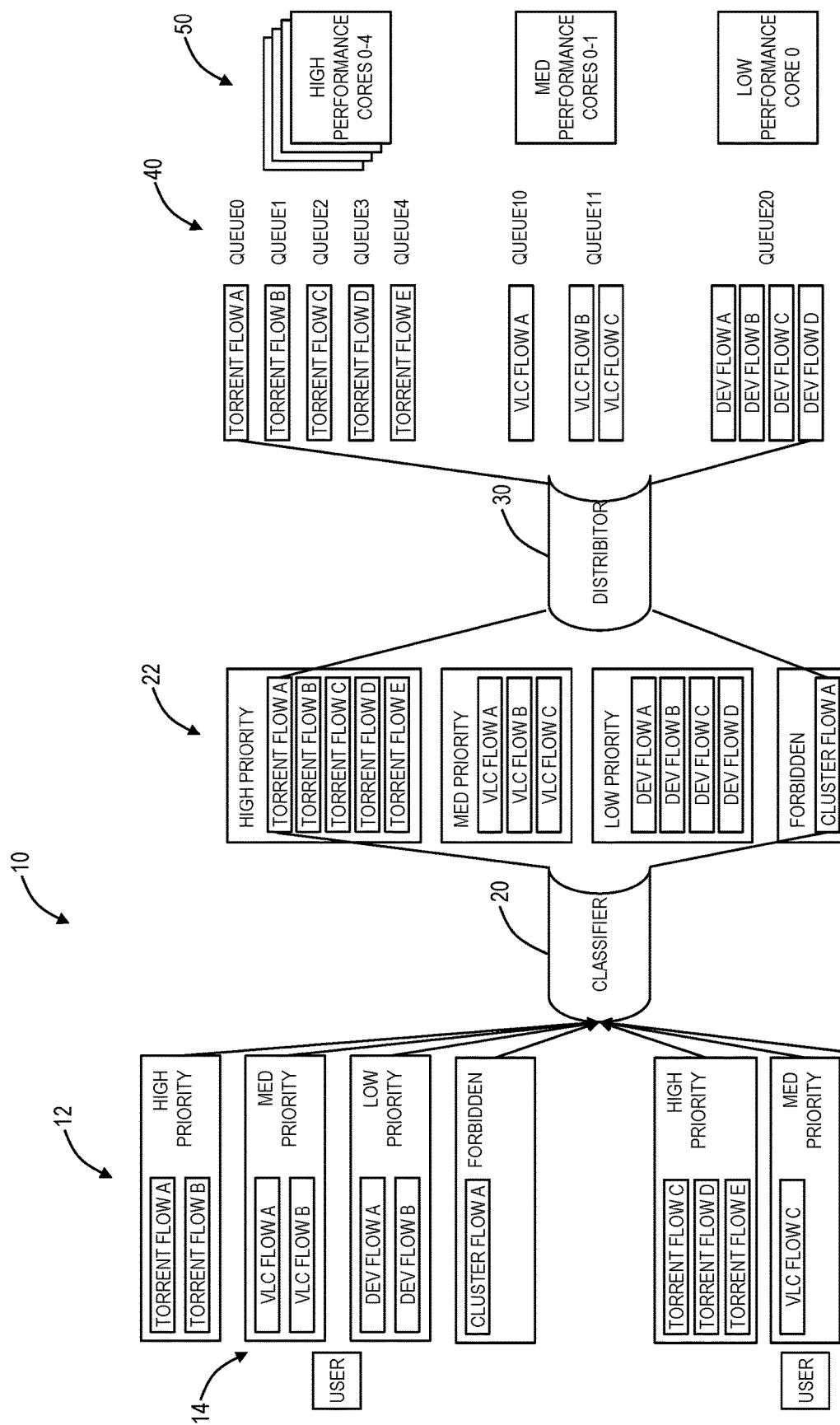
FIG. 2 is a block diagram of the classifier system with a distributor to provide the classified flows to queues for processor cores.

FIG. 2 is a block diagram of the classifier system 10 with a distributor 30 to provide the classified flows 22 to queues 40 for processor cores 50. Again, the classifier system 10 uses existing classification techniques traditionally used to establish frame treatment with the classifier 20, for the purposes of editing, coloring, or TM prioritization, in combination with techniques for polynomial calculation with the distributor 30, traditionally used for Link Aggregation distribution, to automatically route and schedule frames, based on frame content and user configuration, to specific processor cores 50, within an x86 based processing environment which establishes and takes advantage of premium and economy services across a pool of CPU resources.

The classifier system 10 protects flow order, such that frames of a plurality of flows 12 and priorities are returned in the order sent relative to their flow 12, regardless of the number of flows 12, and a number of processor cores 50 involved, using a technique previously used for link aggregation distribution. Advantageously, this eliminates any need to track and apply frame metadata to maintain order while processing frames in parallel across multiple processor cores 50 (or virtual machines).

Further, the classifier system 10 can increase and decrease the number of processor cores 50 available in real-time and is compatible with fast failover operations thus allowing many flows 12 to be switched to new processor cores 50 with minimal software overhead in the event of hardware or software failure.

The classifier system 10 can identify a flow 12 or an application by its content, determine which flow 12 it belongs to in real-time, and send that flow to a particular processor core 50 or virtual machine. The nature of a singular core allows for frame order to be maintained internally, but the nature of a multi-core, parallel system, is such that merging multiple streams requires management to ensure that frame order is maintained as the output of each singular core is placed back into the output of the whole. With the ability to extract and identify singular flows on the fly, singular flows can be directed to a singular core 50 or virtual machine, where only the traffic in that flow must maintain order relative to itself. That is, the classifier system 10 can avoid the overhead of frame reordering by constraining singular flows (same user, same application) to a specific processor core 50. This means that when traffic merges from the individual cores 50 back into the whole, there is no requirement to ensure that order is maintained because the flow order is already ensured by virtue of the singular core 50 processing order. The classifier system 10 provides the ability to precisely control how many flows 12 are directed to particular processor cores 50, and thus, entire logical interfaces can be serviced in parallel without fear of frame reordering within the flows contained within the logical interface.

In the example of FIG. 2, the classifier 20 can only sort by overall priority, to begin with, i.e., high, medium, low, and forbidden. The distributor 30 can be a polynomial distributor that uses frame-based fields to identify flows 12. For example, in this case, frames identified as belonging to an important application can be sent to a high priority processor core 50, and within those processor cores 50, the frames are distributed to different queues 40, in a way that ensures that all frames belonging to a particular flow 12, go to the same processor core 50.

Further, in the example of FIG. 2, relative to the medium priority applications, only two queues 40 are used, and as such, all medium application frames are distributed to the two queues. There are three medium priority flows. Thus, one of the queues can see traffic from two flows, while the other can only see traffic from one flow. Relative to the low priority applications, all flows are sent to one queue 40. In this case, all flows will maintain priority to one another, but that would be the price of being a low priority application in this particular configuration.

Specifically, in the example of FIG. 2, there are five queues 0-4 for five high-performance processor cores, numbered as 0-4, two queues, numbered as 10, 11 for the medium performance cores, numbered as 0, 1, and one queue, numbered as 20 for a low-performance core, numbered as 0.

The classifier system 10 provides an ability to give preference to certain types of flows, video traffic for instance, to higher performance processors, virtual machines or CPU's, while web traffic is pushed to lower end platforms.

Figure 3:
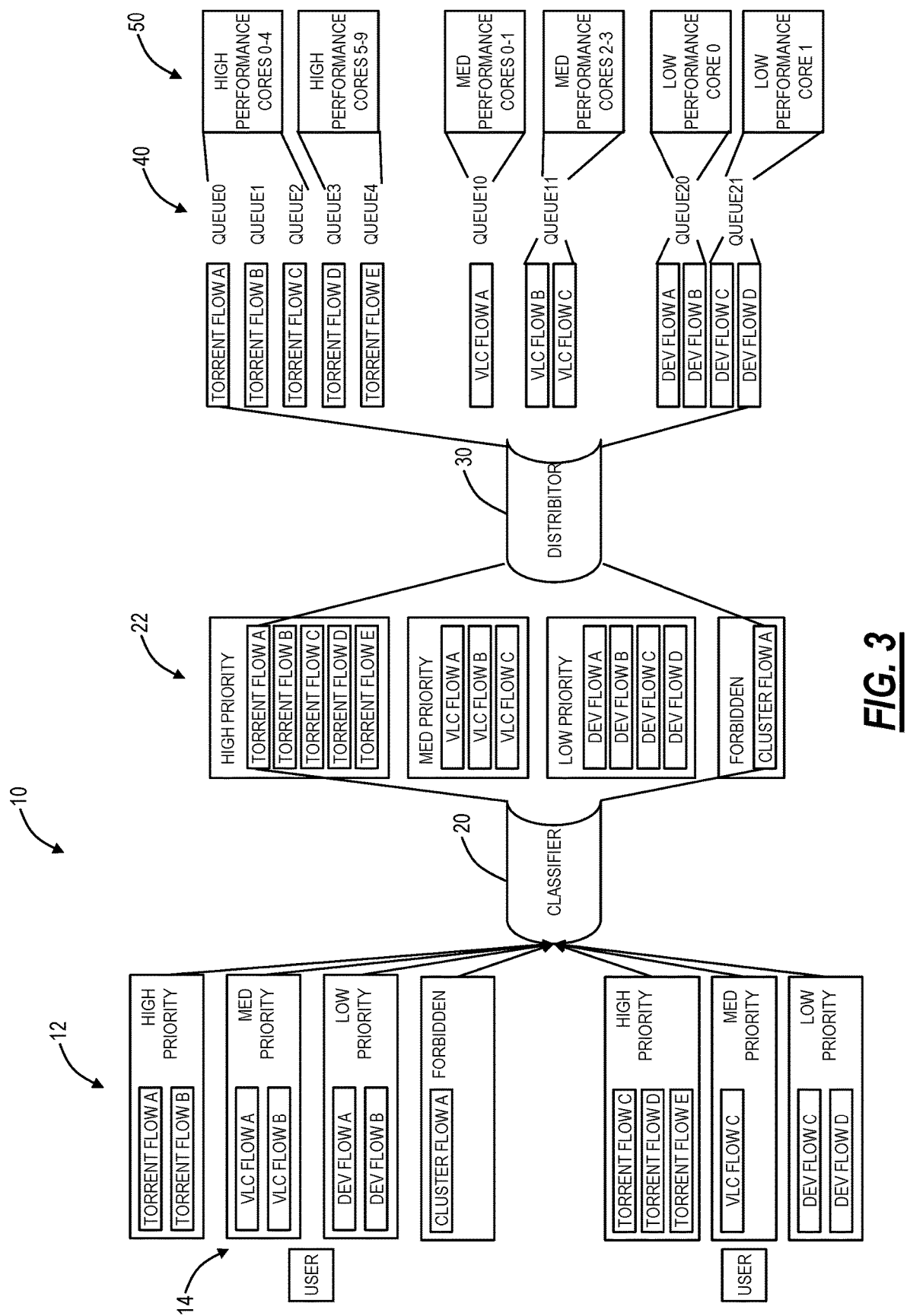
FIG. 3 is a block diagram of another example of the classifier system with additional queues and processor cores.

FIG. 3 is a block diagram of another example of the classifier system 10 with additional queues 40 and processor cores 50. Here, there is the same number of queues 40 as the example of FIG. 2 with additional processor cores 50, namely high-performance cores 0-4, 5-9, medium performance cores 0, 1, 2, 3, and low-performance cores 0, 1. Further classification using IP addresses or MAC addresses may occur to narrow down the traffic to a per-user basis. In this case, one implementation may require classifier entries be equal to NUMBER_OF_USERS×NUMBER_OF_APPLICATIONS.

Figure 4:
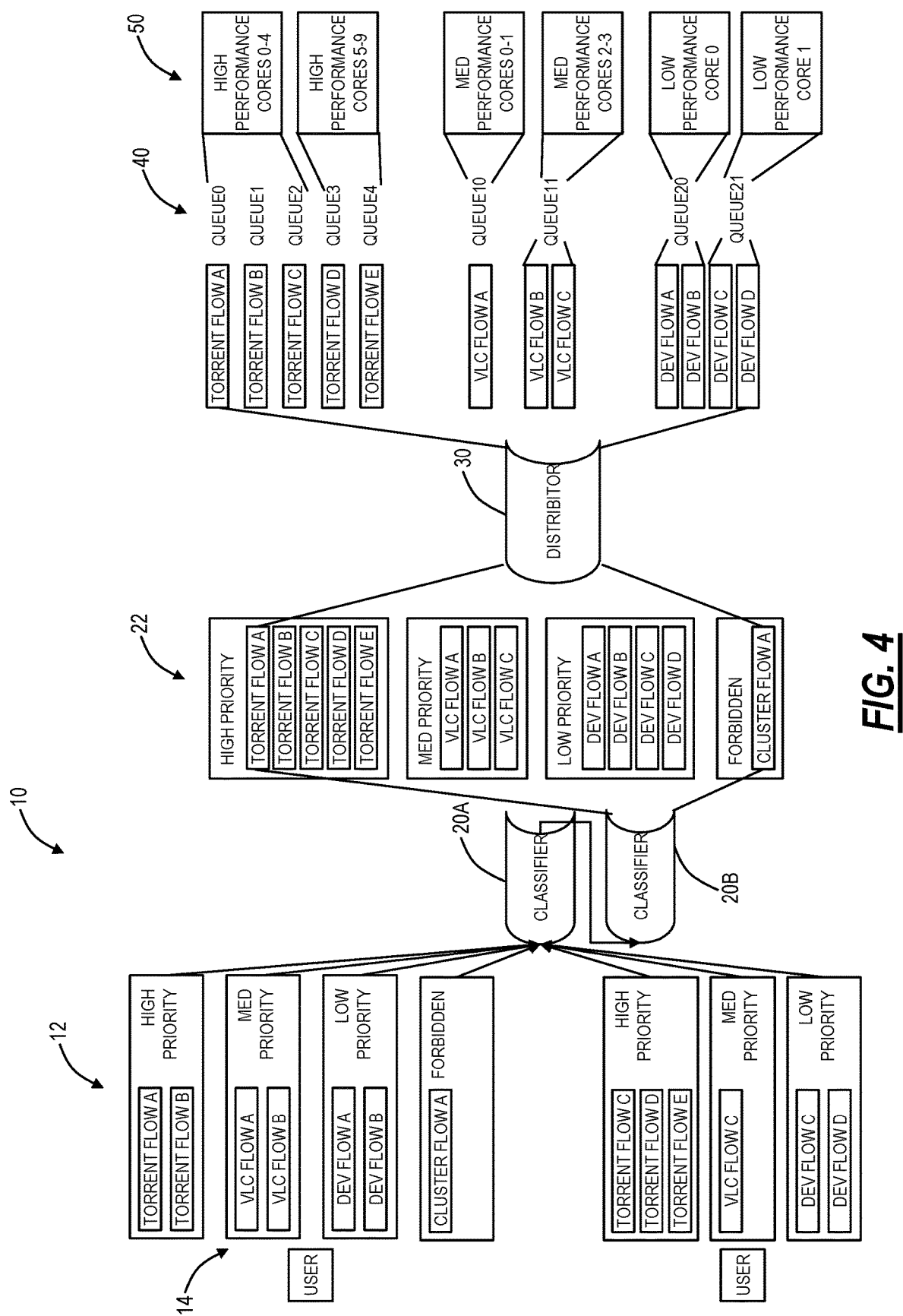
FIG. 4 is a block diagram of another example of the classifier system with dual classifiers.

FIG. 4 is a block diagram of another example of the classifier system 10 with dual classifiers 20A, 20B. Specifically, the dual classifiers 20A, 20B can include an application classifier 20A and a user classifier 20B, where the first classifier 20A determines flow priority and the second classifier 20B determines user grouping. Note that among multiple users, one user might be a higher priority than another, and as such, has access to more queues, more cores, or higher performance CPU's.

Thus, the classifiers 20, 20A, 20B are configured to prioritize the flows 12 based on application and user. The distributor 30 is configured to distribute the classified flows 22 within a priority to the different queues 40.

An existing approach is used in LAG distribution, developed by the assignee of the present application, Ciena. The problem statement in LAG distribution is how to distribute packets to different LAG members for load balancing purposes. The approach was developed for LAG distribution on network processor (NP) platforms using portions of the MAC Source Address (SA), MAC Destination Address (DA), IP Source (SRC), IP Destination (DST), and User Datagram Protocol (UDP) port, using Exclusive OR (XOR) calculations.

In a simplified example described herein, the Least Significant Byte (LSB) of the DA and SA are XOR'd to create a 4-bit value for selection of a bin within a lookup table. The bin selected allows a user to control the distribution probability.

For example, assume the following values:
MAC DA=0x505152535455
MAC SA=D0D1D2D3D4D5.
MAC DA[7:0] XOR MAC SA[7:0]==0 0x55 XOR 0xD5==0x80==RESULT_X    RESULT_X[3:0] XOR RESULT_X[7:4]==0x0 XOR 0x8==0x8==RESULT_Y For example, assume the following polynomial entry table:

POLY ENTRY TABLE

| Bin | | | | | | | |
|---|---|---|---|---|---|---|---|
| 15 | 14 | 13 | 12 | 11 | 10 | 9 | 8 |
| QUEUE 0 | QUEUE 1 | QUEUE 2 | QUEUE 0 | QUEUE 1 | QUEUE 2 | QUEUE 0 | QUEUE 1 |

| Bin | | | | | | | |
|---|---|---|---|---|---|---|---|
| 7 | 6 | 5 | 4 | 3 | 2 | 1 | 0 |
| QUEUE 2 | QUEUE 0 | QUEUE 1 | QUEUE 2 | QUEUE 0 | QUEUE 1 | QUEUE 2 | QUEUE 0 |

The RESULT_Y of 0x8 is used to select BIN 8 which has QUEUE 1 assigned to it above. This table can be 256 bins wide as an enhancement and provide better granularity for distribution.

Using this approach, combined with the classification of user-based traffic, multiple POLY ENTRIES can be created in the POLY ENTRY Table, per customer, and/or per application such that two customers may have their own queues.

| CUSTOMER POLY ENTRY | APPLICATION CLASSIFICATION | Bin 15 | Bin 14 | ... | Bin 2 | Bin 1 | Bin 0 |
|---|---|---|---|---|---|---|---|
| Customer A | Torrent | QUEUE 0 | QUEUE 1 | | QUEUE 1 | QUEUE 2 | QUEUE 0 |
| Customer A | VLC | QUEUE 5 | QUEUE 4 | | QUEUE 5 | QUEUE 4 | QUEUE 5 |
| Customer B | Web Traffic | QUEUE 9 | QUEUE 8 | | QUEUE 9 | QUEUE 7 | QUEUE 8 |
| Customer B | Torrent | QUEUE 3 | QUEUE 3 | | QUEUE 3 | QUEUE 3 | QUEUE 3 |

With each queue having a particular CPU assignment, the classifier system 10 can direct traffic specific to a user and application to a specific CPU. It can also be seen in the table above that certain customers may be allocated multiple CPU queues for a specific application while others are allocated only one CPU queue.

Advantageously, the classifier system 10 allows load distribution on the processor cores 50 for NFV applications without additional frame metadata with embedded serial numbers to maintain frame order. That is, traffic for a singular flow would be sent to a singular core and would never distribute to multiple cores on its own. Under heavy traffic, where multiple cores are in use along with multiple flows, distribution of traffic across multiple CPU's is achieved by the distributor 30.

This classifier system 10 provides automatic and statistically balanced distribution of flows to multiple cores without requiring extra classification capabilities that would burn extra CPU cycles due to the scale of the lookup. Rather, the classifier system 10 uses a mathematical calculation for distribution which is a high-performance capability of an x86 platform, or it would use a hardware-based co-process performing the same task, thus further offloading the CPU and providing increased NVF processing bandwidth.

Figure 5:
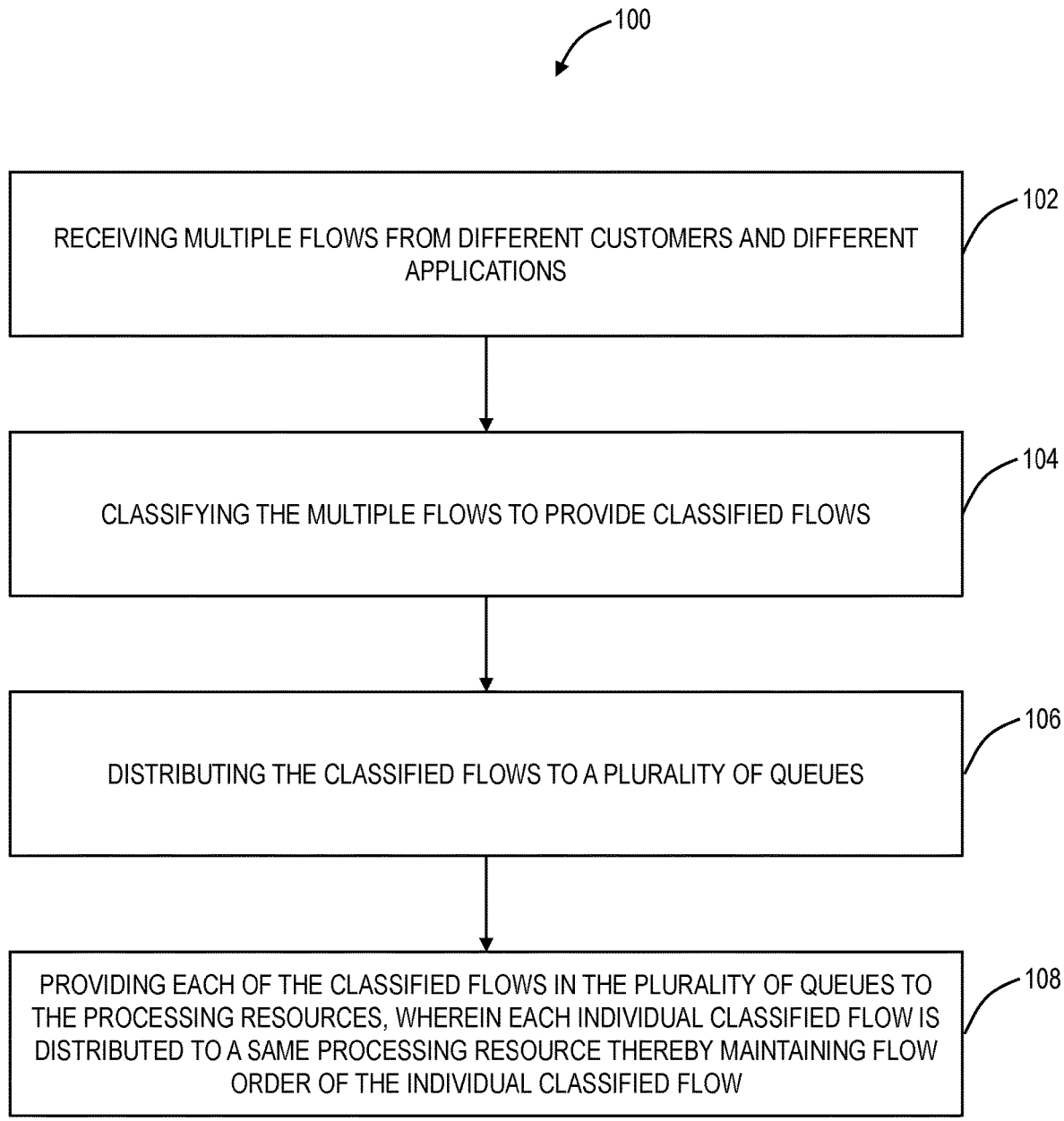
FIG. 5 is a flowchart of a classifier process for flow and application based processor scheduling for Network Function Virtualization (NFV) applications.

FIG. 5 is a flowchart of a classifier process 100 for flow and application based processor scheduling for Network Function Virtualization (NFV) applications. The classifier process 100 includes receiving multiple flows from different customers and different applications (step 102); classifying the multiple flows to provide classified flows (step 104); distributing the classified flows to a plurality of queues (step 106); and providing each of the classified flows in the plurality of queues to the processing resources, wherein each individual classified flow is distributed to the same processing resource thereby maintaining flow order of the individual classified flow (step 108).

The classifying can differentiate the multiple flows on an application basis. The classifying can differentiate the multiple flows on both an application basis and a user basis. The classifying can differentiate the multiple flows on both an application basis and a user basis, and each application can be assigned a designated priority with the distributing including providing flows of the same priority to different queues. The classifying can differentiate the multiple flows based on different priorities.

The processing resources can include one or more of individual processing cores in a multi-core processing system and Virtual Machines (VMs). The processing resources can include individual processing cores in a multi-core processing system such that each individual classified flow is distributed to the same processing core thereby maintaining flow order of the individual classified flow. The distributing can utilize a plurality of characteristics of each individual flow to assign a queue based thereon. The classifying and the distributing can assign a queue based on a user and application for each flow.

In another embodiment, a system configured to perform scheduling for Network Function Virtualization (NFV) on processing resources includes one or more classifiers configured to receive multiple flows from different customers and different applications and to classify the multiple flows into classified flows; and a distributor configured to distribute the classified flows to a plurality of queues, wherein the plurality of queues are each connected to associated processing resources to provide each of the classified flows thereto, wherein each individual classified flow is distributed to the same processing resource thereby maintaining flow order of the individual classified flow.

In a further embodiment, an apparatus for scheduling for Network Function Virtualization (NFV) on processing resources includes circuitry configured to receive multiple flows from different customers and different applications; circuitry configured to classify the multiple flows to provide classified flows; circuitry configured to distribute the classified flows to a plurality of queues; and circuitry configured to provide each of the classified flows in the plurality of queues to the processing resources, wherein each individual classified flow is distributed to the same processing resource thereby maintaining flow order of the individual classified flow. The circuitry can be implemented in one or more Field Programmable Gate Arrays (FPGAs).

Figure 6:
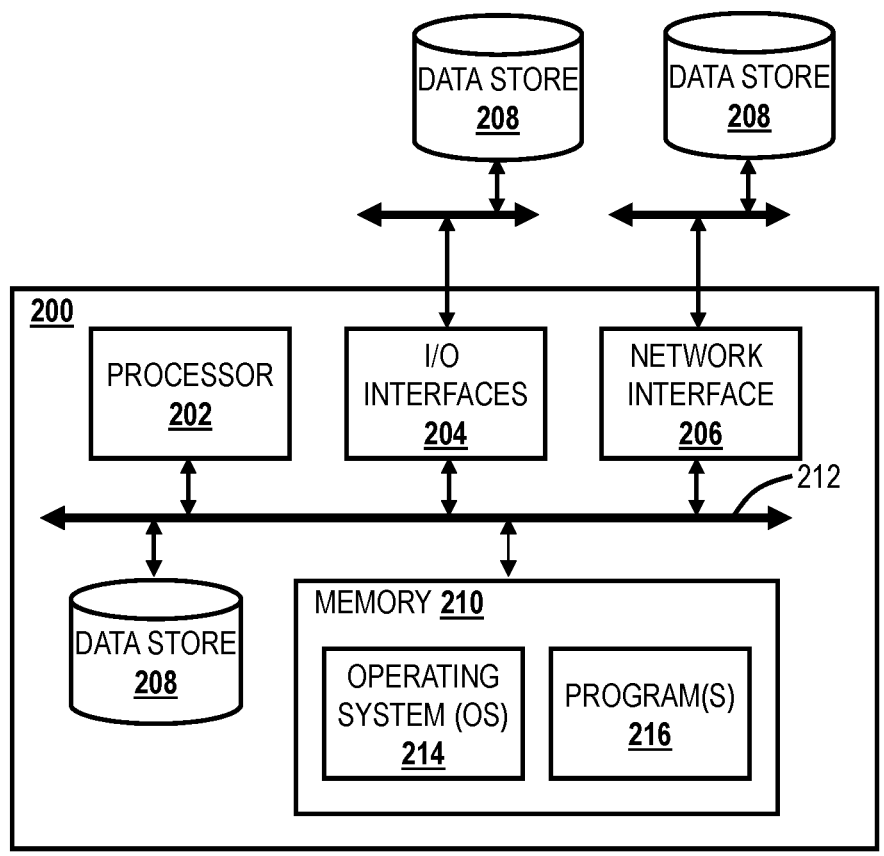
FIG. 6 is a block diagram of an x86 server which may be used to implement the processor cores, a virtual machine, and a software-based classifier system.

FIG. 6 is a block diagram of an x86 server 200 which may be used to implement the processor cores 50, a virtual machine, and a software-based classifier system 10. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of scheduling for Network Function Virtualization (NFV) on processing resources, the method comprising:
   receiving multiple flows of packets from different users and different applications;
   classifying the multiple flows of packets to identify a priority classification for each of the multiple flows based on one or more of an application from which a flow of packets originated and a user associated with the flow of packets for each of the multiple flows of packets to provide classified flows of packets;
   identifying the classified flows and the priority classification thereof using frame-based fields and distributing the classified flows of packets to different queues of a plurality of queues by using logical calculations on the frame-based fields to identify which of a plurality of bins each of the plurality of flows is associated with using a polynomial entry table, each of the plurality of bins being associated with one of the plurality of queues, each of the plurality of queues being associated with one of the processing resources, and each of the classified flows of packets being distributed to a respective queue based on a bin associated with a classification thereof such that all frames belonging to a particular flow are directed to a same processing resource; and
   providing each of the classified flows of packets in the plurality of queues to the one of the processing resource associated therewith, wherein for each of the classified flows of packets, all packets associated therewith are distributed to a same queue such that a same processing resource processes all of the packets associated therewith, thereby constraining a singular flow of all of the packets associated with one or more of a same user and a same application to the same processing resource without additional frame metadata and maintaining flow order for all of the packets for each of the classified flows of packets such that merging of the multiple flow of packets from the processing resources is based on the flow order without use of the additional frame metadata.

2. The method of claim 1, wherein each application is assigned a designated priority, given to flows of packets associated therewith, with the distributing comprising providing the flows of packets of a same priority to different queues.

3. The method of claim 1, further comprising performing one of increasing and decreasing a number of the processing resources in real time and distributing the classified flows to the processing resources based on the one of the increased and the decreased number of the processing resources.

4. The method of claim 1, wherein the processing resources comprise one or more of individual processing cores in a multi-core processing system and Virtual Machines (VMs).

5. The method of claim 1, wherein the processing resources comprise individual processing cores in a multi-core processing system such that each of the classified flows of packets is distributed to a same processing core thereby maintaining flow order of the individual classified flow.

6. The method of claim 1, wherein the distributing utilizes a plurality of characteristics of each individual flow of packets to assign a queue based thereon.

7. The method of claim 1, wherein a distribution probability of the multiple flows of packets is controlled based on selecting which queue is associated with each of the plurality of bins.

8. The method of claim 1, wherein the classifying the multiple flows of packets, the identifying the classified flows of packets, and the distributing the classified flows of packets is performed without utilizing additional frame meta-data identifying a frame order, the method further comprising merging the multiple flows from the processing resources without utilizing the additional frame meta-data identifying the frame order.

9. The method of claim 1, wherein the classifying the multiple flows of packets includes finding the applications and sorting them into desired priorities, and wherein a number of classifier entries of the polynomial entry table is equal to a number of the users and a number of the applications.

10. A system configured to perform scheduling for Network Function Virtualization (NFV) on processing resources, the system comprising:
   one or more classifiers configured to receive multiple flows of packets from different users and different applications and to classify the multiple flows of packets into classified flows of packets to identify a priority classification for each of the multiple flows based on one or more of an application from which a flow of packets originated and a user associated with the flow of packets for each of the multiple flows of packets, each of the one or more classifiers being one of (1) memory stored instructions that, when executed cause a processor to perform the receiving and classifying, (2) hardware circuitry, and (3) a combination thereof; and
   a distributor configured to identify the classified flows and the priority classification thereof using frame-based fields and distribute the classified flows of packets to different queues of a plurality of queues by using logical calculations on the frame-based fields to identify which of a plurality of bins each of the plurality of flows is associated with using a polynomial entry table, each of the plurality of bins being associated with one of the plurality of queues, each of the plurality of queues being associated with one of the processing resources, and each of the classified flows of packets being distributed to a respective queue, the distributor being one of (1) memory stored instructions that, when executed cause a processor to perform the distributing, (2) hardware circuitry, and (3) a combination thereof based on a bin associated with a classification thereof,
   wherein the plurality of queues are each connected to associated processing resources to provide each of the classified flows of packets to the one of the processing resource associated therewith, wherein for each of the classified flows of packets, all packets associated therewith are distributed to a same queue such that a same processing resource processes all of the packets associated therewith, thereby constraining a singular flow of all of the packets associated with one or more of a same user and a same application to the same processing resource without additional frame metadata and maintaining flow order for all of the packets for each of the classified flows of packets such that merging of the multiple flow of packets from the processing resources is based on the flow order without use of the additional frame metadata.

11. The system of claim 10, wherein each application is assigned a designated priority, given to flows of packets associated therewith, with the distributor providing the flows of packets of a same priority to respective queues.

12. The system of claim 10, wherein a number of the processing resources used for the processing of the classified flows is one of increased and decreased in real time and distributing the classified flows to the processing resources based on the one of the increased and the decreased number of the processing resources.

13. The system of claim 10, wherein the processing resources comprise one or more of individual processing cores in a multi-core processing system and Virtual Machines (VMs).

14. The system of claim 10, wherein the processing resources comprise individual processing cores in a multi-core processing system such that each of the classified flows of packets is distributed to a same processing core thereby maintaining flow order of the individual classified flow.

15. The system of claim 10, wherein the distributor utilizes a plurality of characteristics of each individual flow of packets to assign a queue based thereon.

16. The system of claim 10, wherein a distribution probability of the multiple flows of packets is controlled based on selecting which queue is associated with each of the plurality of bins.

17. The system of claim 10, wherein the classifying the multiple flows of packets, the identifying the classified flows of packets, and the distributing the classified flows of packets is performed without utilizing additional frame meta-data identifying a frame order, the method further comprising merging the multiple flows from the processing resources without utilizing the additional frame meta-data identifying the frame order.

18. The system of claim 10, wherein the classifying the multiple flows of packets includes finding the applications and sorting them into desired priorities, and wherein a number of classifier entries of the polynomial entry table is equal to a number of the users and a number of the applications.

19. An apparatus for scheduling for Network Function Virtualization (NFV) on processing resources, the apparatus comprising:
circuitry configured to receive multiple flows of packets from different users and different applications;
circuitry configured to classify the multiple flows of packets to provide classified flows of packets to identify a priority classification for each of the multiple flows based on one or more of an application from which a flow of packets originated and a user associated with the flow of packets for each of the multiple flows of packets;
circuitry configured to identify the classified flows and the priority classification thereof using frame-based fields and distribute the classified flows of packets to different queues of a plurality of queues by using logical calculations on the frame-based fields to identify which of a plurality of bins each of the plurality of flows is associated with using a polynomial entry table, each of the plurality of bins being associated with one of the plurality of queues, each of the plurality of queues being associated with one of the processing resources, and each of the classified flows of packets being distributed to a respective queue based on a bin associated with a classification thereof; and
circuitry configured to provide each of the classified flows of packets in the plurality of queues to the one of the processing resource associated therewith, wherein for each of the classified flows of packets, all packets associated therewith are distributed to a same queue such that a same processing resource processes all of the packets associated therewith, thereby constraining a singular flow of all of the packets associated with one or more of a same user and a same application to the same processing resource without additional frame metadata and maintaining flow order for all of the packets for each of the classified flows of packets such that merging of the multiple flow of packets from the processing resources is based on the flow order without use of the additional frame metadata.

20. The apparatus of claim 19, wherein the circuitry is implemented in one or more Field Programmable Gate Arrays (FPGAs).

* * * * *